United States Patent [19]

Hamrick

[11] 4,202,531
[45] May 13, 1980

[54] PNEUMATIC RODDING OF CONDUIT USING EVERTED FLEXIBLE TUBING

[75] Inventor: James C. Hamrick, Kings Mountain, N.C.

[73] Assignee: Thomas Industries of Tennessee Inc., Matthews, N.C.

[21] Appl. No.: 947,531

[22] Filed: Oct. 2, 1978

[51] Int. Cl.² ............................................. A61M 25/00
[52] U.S. Cl. ................................................... 254/134.4
[58] Field of Search .................. 254/134.4, 134.3 FT; 128/2 M, DIG. 9, 348, 349

[56] References Cited

U.S. PATENT DOCUMENTS

| 3,119,599 | 1/1964 | Tuttle | 254/134.4 |
| 4,077,610 | 3/1978 | Masuda | 254/134.4 |

Primary Examiner—Robert C. Watson
Attorney, Agent, or Firm—Emrich, Root, O'Keeffe & Lee

[57] ABSTRACT

Utility lines or cables are installed in underground conduit using imperforate flexible tubing having a circumference no less than that of the conduit interior. One end of the tubing is everted and fixed within the conduit near end. Air blown into said near end is directed against a displaceable pocket between the fixed everted end and entering portion of the tubing so that the tubing lines the conduit interior wall, taking its shape and strength therefrom, as it is advanced through the conduit to the far end thereof. In one embodiment, the tubing when half way through is severed outside the conduit near end and a pull line attached thereto is drawn with the tubing the rest of the way through the conduit to its far end; and the tubing is twisted on the pull line to form a tow of higher tensile strength. In a modification, the twisting step is omitted and the pull line is attached to the inner portion of the tubing at the far end of the conduit; and it is drawn with the inner portion of the tubing back through the everted portion while continuing to blow air of reduced pressure into the near end of the conduit to prevent tubing collapse.

18 Claims, 13 Drawing Figures

PNEUMATIC RODDING OF CONDUIT USING EVERTED FLEXIBLE TUBING

This invention embodies novel means and method of pneumatically rodding conduits utilizing thin flexible tubing to facilitate the installation of telephone and/or other utilities cable or line therein.

Commonly, telephone cable lines and the like are installed in underground buried conduits comprising sections laid end to end and terminating at opposed ends in a manhole or equivalent area. The spacing of said manholes and therefore the overall length of the conduit may be several hundred feet and more. Various methods have been devised for feeding the cable through the long lengths of conduit between manholes. Commonly this has been accomplished by attaching one end of a cord or pull line to a light weight carrier or piston which is propelled through the conduit between manholes utilizing a blower or suction source located at one end of the conduit to effectively drive the carrier and its pull line through the conduit. The pull line is then available to pull the heavier cable through the conduit. The effectiveness of such methods is however dependent on the conduit being relatively air tight along its length and clear of water, soil, rocks and other implements.

In Swedish Pat. No. 221,955 and German Pat. No. 1,289,565 tubing is loaded in an airtight container which is connected through a valve to a source of compressed air. One end portion of the tubing is led out through a provided spout of the container and fixed in an everted condition over the spout end so that on opening the valve, the entering compressed air drives the tubing out the spout in an inflated state into the receiving end of the larger diametered conduit with which the spout end is aligned. The tubing on reaching the opposite end of the conduit is tied to the cable or its pull line and used to pull the same back through the conduit to its entering end.

In Tattle U.S. Pat. No. 3,119,599, tubular material of smaller cross section than the conduit is packed within a carrier or projectile, the free end of the tubular material being fixed to the entering end of the conduit; and air is blown into the tubing causing the projectile to travel along the conduit and unpack the tubing therefrom.

In accordance with the present invention, thin imperforate plastic film material in tubular form having a circumferential dimension no less than that of the conduit interior is fed through the conduit to line the interior wall thereof by first everting one end of the tubing and fixing the everted tubing end within the near end of the conduit and so that the remainder of the tubing protrudes therethrough outwardly of the conduit. Air is then blown into the conduit and against the pocket thus formed between the fixed everted end and the outwardly projecting tubing effectively displacing the pocket toward the far end of the conduit causing the tubing to proceed through and closely line the conduit interior wall.

Because the tubing is of thin flexible plastic film and no smaller in circumference than the conduit interior wall, it closely conforms thereto including any water, soil or other impediment present so that it takes strength and shape therefrom. Thus it effectively lines the conduit through its full length and the impelling force of the air blown into the near end of the conduit is not diminished through leakage or resistance to movement of the tubing through the conduit.

In one embodiment of the invention, a pull line is attached to the tubing pocket when it is ejected through the far end of the conduit and the tubing is drawn back through the conduit near end to draw the pull line therethrough while continuing to blow air into the conduit near-end at a reduced pressure which prevents collapse and bunching of the tubing.

In a second embodiment, the tubing is severed outside the conduit near-end when the pocket is displaced halfway through the conduit and a pull line is attached to said severed tubing. With continued blowing of air into the conduit near-end, the pull line moves with the severed end of the tubing through the conduit and out its far end. The tubing with the pull line inside is then held at both ends of the conduit and twisted tightly to form a tow line of higher tensile strength than either the pull line or tubing along to which a sturdier pull line or the utility cable itself may be attached and drawn through the conduit.

Thus an important feature of the invention is that the method is useful to install utility lines or cables in long lengths of conduit irrespective of whether they are air tight.

A further feature is that tubing of thin film material is utilized which conforms to the shape of the interior wall and/or impediments in the conduit which it meets without interrupting or halting progress of the tubing through the conduit.

Because the tubing has a circumference no less than that of the conduit interior it is able to take strength and shape from that against which it engages under the force of the air blown into the tubing pocket at the conduit near-end so that the conduit wall protects the tubing; and with only nominal pressure the tubing can be quickly blown through the conduit. In the event water or other impediment is present in the conduit, the tubing pocket progress is not halted and the tubing does not burst in response to pressure build up. Instead the tubing "goes around". Effectively, the water or impediment acts as the conduit wall to support the thin walled tubing which conforms thereto.

Another feature of the invention is that it is also useful in installing a second utility line in a conduit already containing one or more utility lines. The tubing pocket, as the tubing unfolds through the conduit in response to the air blown in the near end of the conduit, simply treats the installed lines as part of the conduit wall to which it conforms.

Further features, objects and advantages of the invention include the economy afforded and convenience as well as speed of operation achieved in pneumatically rodding a pull line through incompletely sealed conduit sections which may or may not contain water or other impediments.

Still other features, objects and advantages of the invention will be at once apparent or will become so, upon consideration of the preferred embodiments of the invention which now will be more completely described in connection with the accompanying drawings.

Referring now to the drawing wherein like items are identified by like reference numerals:

FIG. 1 illustrates at C a conduit comprising end-to-end placed conduit sections C' which establish communication with a pair of manholes M', M" which may be spaced several hundred feet apart. Each said conduit sections C' is shown provided with dividing walls such that when properly assembled the conduit comprises a plurality of side-by-side located passageways K (FIG. 2) through which telephone cable or other utility lines and the like may be individually housed in isolation. Alternatively, each said conduit sections may comprise a single passageway for housing one or several such line. Such cables or lines are commonly installed using pull lines which are initially threaded through each conduit passageway K from one manhole to the next.

Figure 2:
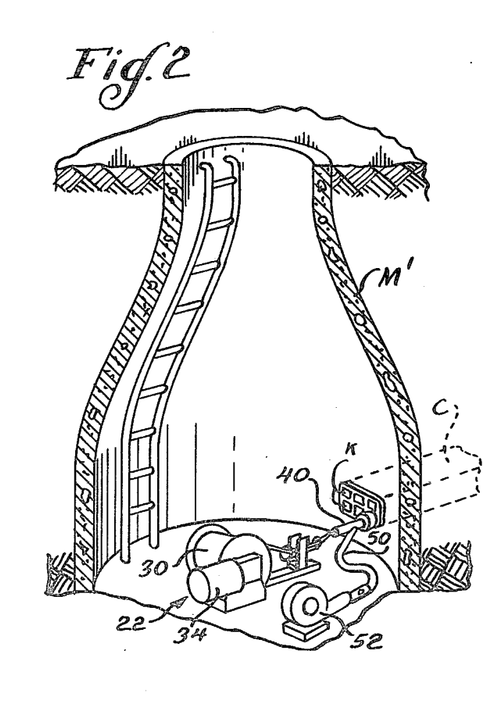
FIG. 2 diagramatically illustrates on an enlarged scale one form of apparatus utilized by the invention.

In the past, the conduit sections would be imperfectly assembled and/or misaligned leaving gaps through which soil, water or both could enter the passageways K to impede the progress of the carrier or piston which was blown through the passageway K. Where the conduit sections comprise several such passageways, air gaps or imperfections in the seal between the sections would allow air to be diverted to an adjacent passageway and so lessen the impelling force thereof on the carrier.

In accordance with this invention, means are provide in the form of appropriate-dimensioned, air tight imperforate thin-walled, exceedingly flexible tubing 20 which can be readily blown through passageway K of the conduit C from one manhole to the next in such fashion so as to line the interior of the conduit while simultaneously serving to install a pull line or the utility cable itself.

Figure 1:
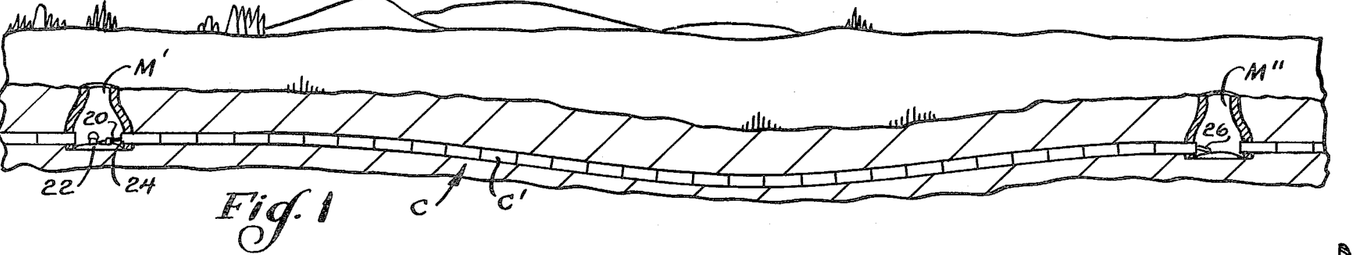
FIG. 1 diagrammatically illustrates an underground buried conduit made up of segments laid end to end between a pair of manholes in which the invention has utility.
Figures 3, 4:
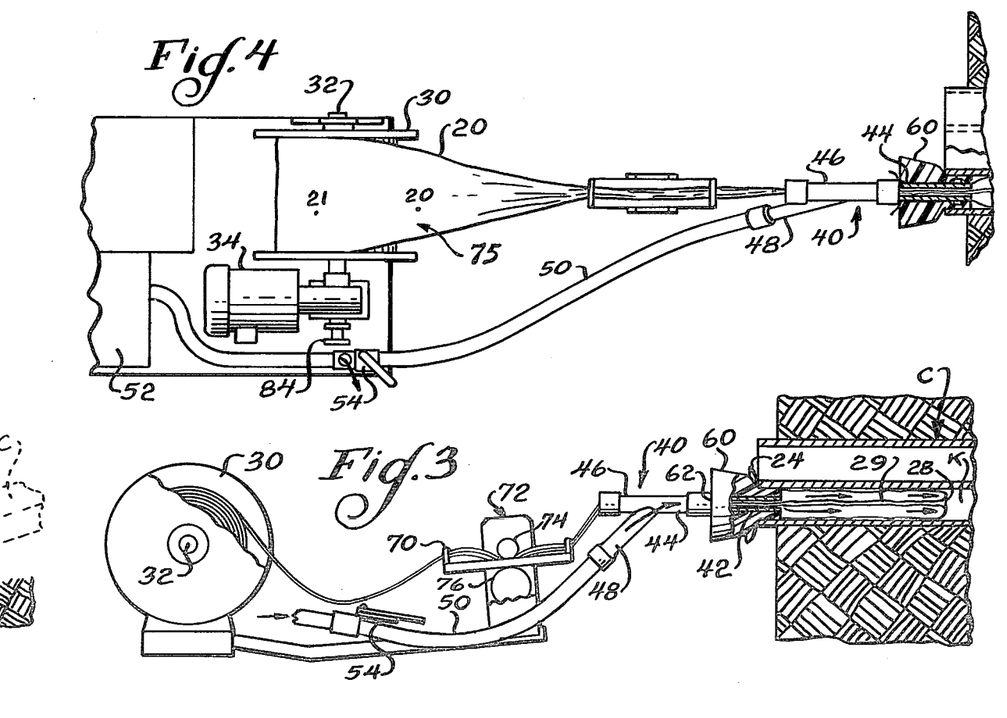
FIG. 3 is a side elevational view, also diagrammatic of the apparatus of FIG. 2.
FIG. 4 is a top plan view, also somewhat diagramatic, of a second form of apparatus.
Figure 5:
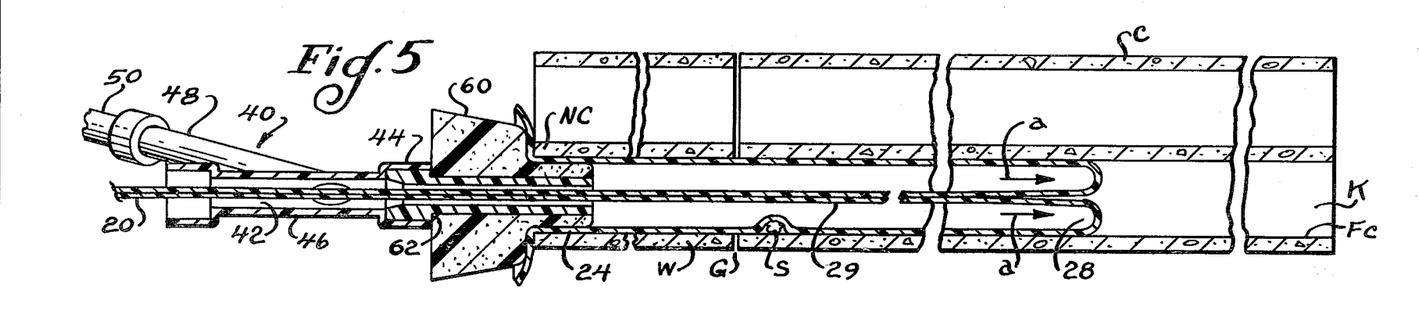
FIG. 5 is a fragmented sectional view taken longitudinally of the conduit illustrated in FIG. 1 and shows the tubing fixed in the near end of the conduit and blown part way therethrough in the direction of the conduit far end.

Considering now also FIGS. 2 and 3 with FIG. 1, apparatus for blowing said tubing 20 through conduit C is indicated generally at 22 in associate with one end 24 of the tubing 20 which is fixed in the near end NC (FIG. 5) of the conduit C in manhole M'.

As seen best in FIGS. 2, 3 and 4 such apparatus comprises a reel 30 on which is mounted a roll of flat tubing 20, the reel being freely rotatable on supporting shaft 32. Optionally, reel 30 may be releasably clutched or pinned to shaft 32 so as to be rotated by energizing motor 34. At 40 is a Y-adapter having a central bore 42 through its stem portion 44 and its aligned leg 46 into which the tubing 20 feeds. At 48 is an offset leg which connects said central bore 42 of the adapter via hose 50 to blower 52 for blowing the tubing though the conduit so as to initially line the conduit passage and thereby form a tow line which is useful in drawing the utility cable through the conduit as afterwards explained.

At 60 is an annular plug of sponge rubber which is slipped over stem 44 of the adapter against shoulder 62 thereof and has at least its entrant end sized to snuggly fit within the receiving near end NC of the conduit C or its passageway K to be rodded in accordance with this invention. Plug 60 serves to support adapter 40 and immovably fix end 24 of the tubing within said conduit end NC.

Tubing 20 is preferably of a suitable plastic such as polyethylene although it may also comprise a coated fabric such as cotton or nylon. Such material should be air tight and non-elastic. Such material in a wall thickness of about 2 mils is sufficiently flexible that tubing formed thereof can be wound flat in roll form and will readily conform to the shape of any surface or object with which it comes in contact, which are features important to this invention.

As shown in FIGS. 2, 3 and 4 the roll of flat wound tubing is mounted in reel 30 so that its free end 24 can be payed off the top of the roll and directed through a pair of collector rings 70 for collapsing the flat tubing into a small diametered bundle which is fed into the entrant end of bore 42 of the Y-shaped adapter 40. At 72 (FIG. 3) is a counter of conventional construction located between the collector rings. It embodies a pair of rollers 74, 76 between which rollers the tubing is fed on its way off reel 30 to the adapter 40. One of said rollers 76 operates a meter (not shown) to count or measure the footage of the tubing which passes therebetween.

In accordance with this invention the roll of tubing has a length in excess of the conduit length into which it is to be utilized and in cross section it has a circumference not less than the interior circumference of the conduit passageway through which it is to be blown. Where the thin wall tubing is of a size too small to fill the conduit passageway, as afterward explained, the 3 psi pressure which is developed by the blower will burst the confined tubing.

On the other hand tubing too large for the passageway will tend to cause excessive drag and thereby slow down and be less effective. Thus far tests have indicated that 6½ inch wide flat tubing is best for 4 inch round conduit passages and 8 inch wide flat tubing for 4 inch square shaped passages. However, said two sizes of tubing have been found also useful in rodding conduits having as small as 2 inch minimum clear passageways, round and square respectively.

FIGS. 3 and 4 illustrate two methods for fixing the tubing end 24 in the entrant end NC of the conduit passageway to be rodded. Referring first to FIG. 3, and also FIG. 5 which shows the same structure but on a larger scale, the tubing end 24 is pulled perhaps 2 feet beyond the adapter 40, everted or turned back on itself inside out and over the plug 60. The adapter 40 with the everted end of the tubing drawn over the plug 50 is then forced into the near end of the conduit passage K to fix said tubing end 24 within said conduit near end NC, thereby creating an annular pocket 28 about the entering portion 29 of the tubing therebetween and the surrounding fixed end portion 24 of the tubing into which air from blower 52 is directed via hose 50 and the central bore 42 of the adapter 40.

FIG. 4 (and also FIG. 10 on a larger scale) show an alternate method of fixing the tubing end 24 within the near end of passageway K. In said alternate method, tubing end portion 24 is first drawn through the adapter central bore 42 and then everted as in the first described method. However this time, the everted end 24 of the tubing is drawn over the adapter stem 44 and a lock-ring 64 assembled thereover to fix the tubing end portion 24 to said stem 44. The plug 50 is then slid over the adapter stem including the lock ring 64 and the assembly forced into the near end NC of the conduit passage K to fix end portion 24 in said near end.

Referring next to FIGS. 5 through 8, a first embodiment of the invention utilizing the previously described apparatus of either FIG. 3 or 4 for pneumatically rodding a passageway K of conduit C in preparation for installing a telephone cable or pull line therefor will now be described.

Assuming the end portion 24 of the tubing has been led through the adapter 40, everted and fixed within the near end NC of the conduit passageway K either by the method of FIG. 3 or 4 and the air control valve 54 (FIG. 3 or 4) opened as illustrated, blower 52 can be started. Very slowly, the air control valve 54 should be closed, causing air to be blown through hose 50 into the central bore 42 of the adapter, therethrough and into the conduit between the entering protion 29 of the tubing and its fixed portion 24 and against pocket 28 as indicated by arrows a. This causes pocket 28 to be displaced in the direction of the far end FC of said passage as tubing 20 pays off the roll on reel 30. As tubing pocket 28 is displaced, the fixed end portion 24 increases in length toward the far end of the passage as does the centrally located entrant portion 29 of the tubing, the former (24) lining the interior wall W of the passageway K bridging any air gaps G existing between conduit sections C' and closely conforming to impediments such as soil S which perhaps was permitted to enter when the conduit sections were assembled. Although the polyethlene material of the tubing is only 2 mils thick, because its circumference is not less than that of the passageway way wall W, the tubing material does not burst but in conforming to the shape of wall W and impediments therein it takes shape and strength therefrom.

Figure 6:
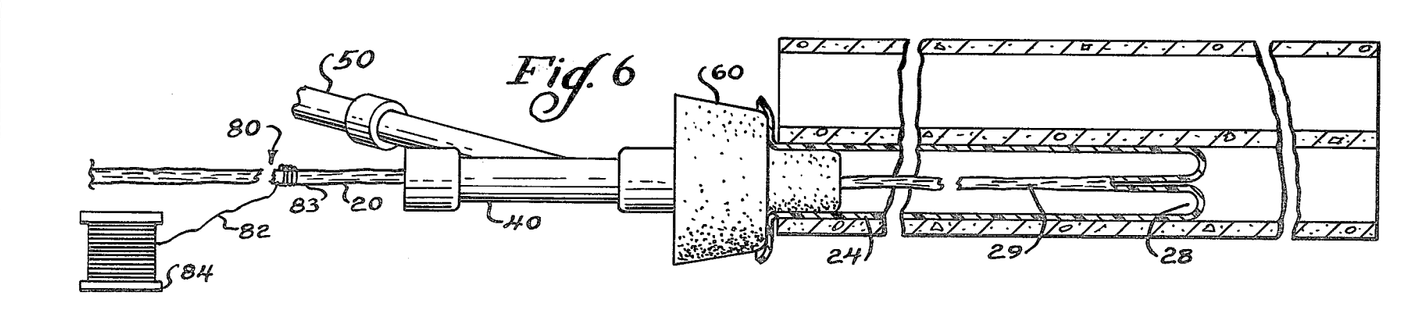
FIG. 6 illustrates the tubing blown half way through the conduit, the tubing having been severed from the supply reel located outside the conduit near end; and shows a pull line tied to said severed tubing end.
Figure 7:
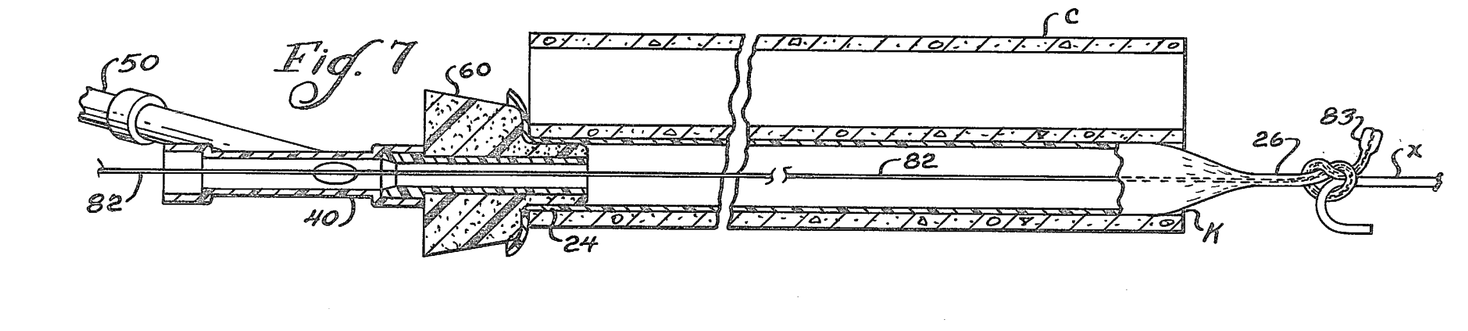
FIG. 7 illustrates the severed end of the tubing blown through the far end of the conduit and a telephone cable or sturdier pull line tied thereto.
Figure 8:
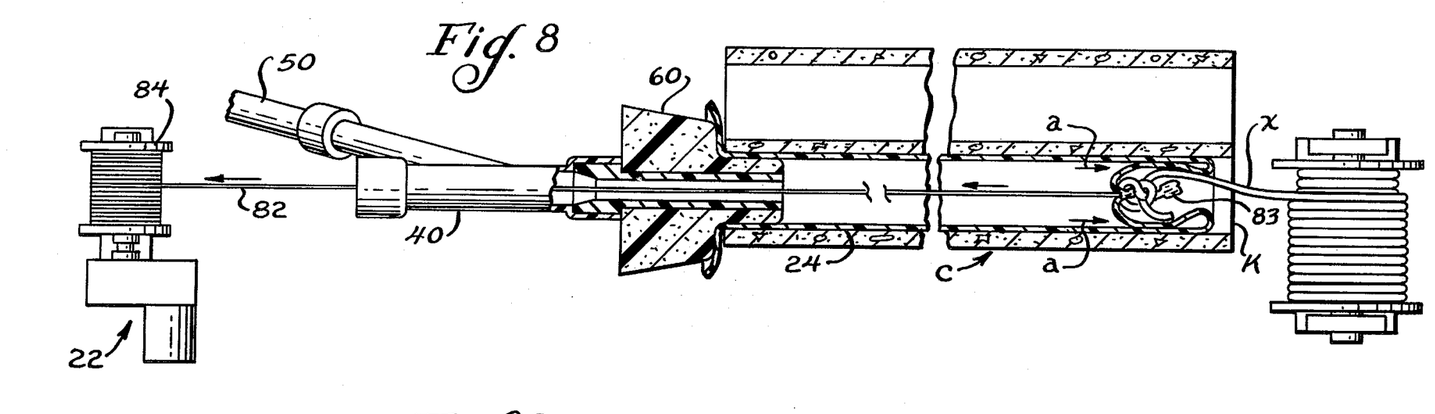
FIG. 8 illustrates the severed end of the tubing and the attached cable being pulled by the draw line back to the near end of the conduit.

In this embodiment of the invention, the tubing is not immediately blown through the far end of the conduit. Instead, progress of the tubing pocket 29 is temporaily halted when the operator notes on the counter 72 that the tubing has moved halfway through the conduit. Optionally, he may take such a reading from measuring indicia or visual markings provided on the tubing as illustrated at 75 in FIG. 4. Halting of the tubing progress is obtained by rotating the shutter comprising the air control valve 54 to its open portion. As illustrated in FIG. 6, when the tubing has moved halfway through the conduit it is severed as at 80 outside the adapter 40 and pull line 82 tied to said severed end 83 of the tubing. The air control valve shutter 54 is then closed and the tubing advance continued until the severed end 83 and the pull line 82 tied thereto is blown through the far end FC of the conduit where the blown through ends of the tubing and the pull line X (FIG. 7) are tied to a utility cable or sturdier pull line which is to be drawn back through the conduit to its starting end. As illustrated in FIG. 6, line 82 may be payed off a winch 84 (FIG. 4) and is now rewound thereon (FIG. 8) by energizing the drive motor 34. In rewinding of the pull lie 82 on which 84 to draw line X to the near end of the conduit, it is advantageous not to completely cut off the air flow into the conduit but to reduce the same to perhaps ¼ of its normal pressure (3 psi). This reduced air flow as indicated by arrows a (FIG. 8) facilitates the return of the tied end 83 of the tubing under the pull of line 82 by holding portion 24 of the tube against the conduit interior wall and minimizing frictional contact therebetween and the returning end of the tube. Collapse and bunching of the tubing is thereby avoided. Once the tied end 83 of the tubing has reached the near or entrant end of the conduit, the adapter 40 and its plug 60 may be pulled from the conduit to gain access to line X drawn therethrough.

Figure 9:
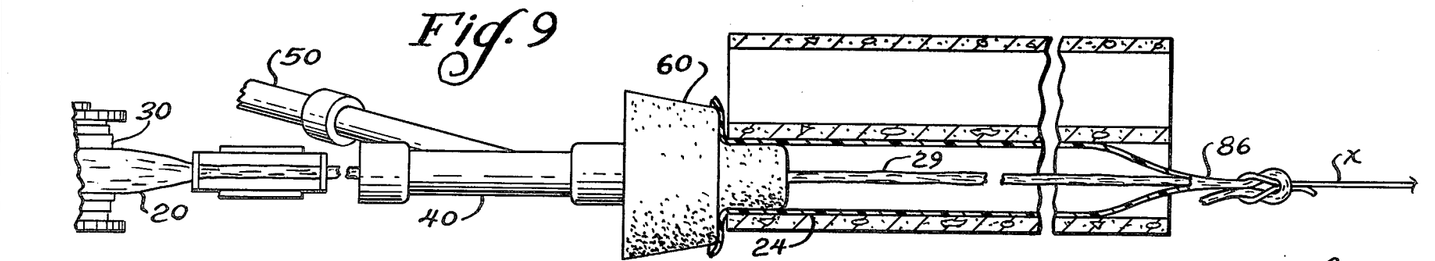
FIG. 9 illustrates another embodiment of the invention wherein the tubing has been blown the full length of the conduit and shows a pull line tied to the pocket portion of the tubing which has passed out through the conduit far end, and is ready to be pulled back to the near end of the conduit by rewinding the tubing on the supply reel.

FIG. 9 illustrates a variation of the embodiment according to FIGS. 5-8 in which the tubing is initially blown all the way through the conduit, the ejected end 86 thereof tied to the pull line X and the tubing 20 returned back through the adapter 40 and rewound on the reel 30 to drawn line X to the entrant end of the conduit. This alternative has the advantages that the tubing can be reused. However, it has the disadvantages that the inherently weak material of which the tubing 20 is formed does not make a good tow line except for pulling a very light line.

Figure 10:
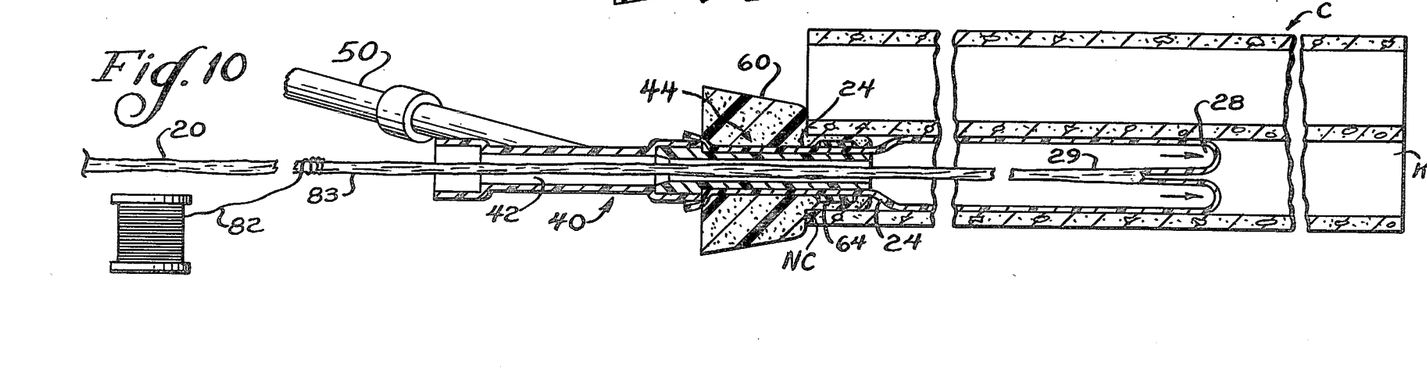
FIGS. 10 and 11 are views generally similar to FIGS. 6 and 7 but showing the apparatus of FIG. 4 being utilized to move the tubing though the conduit.
Figure 11:
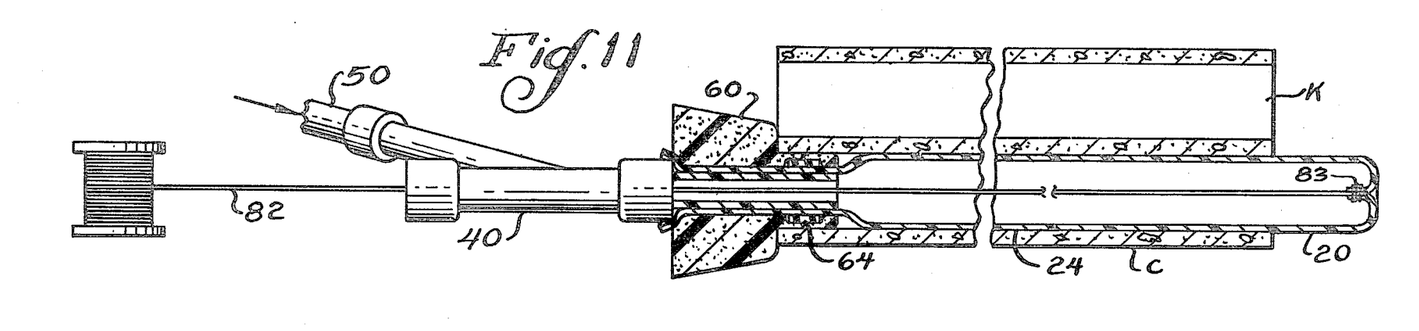
Figure 12:
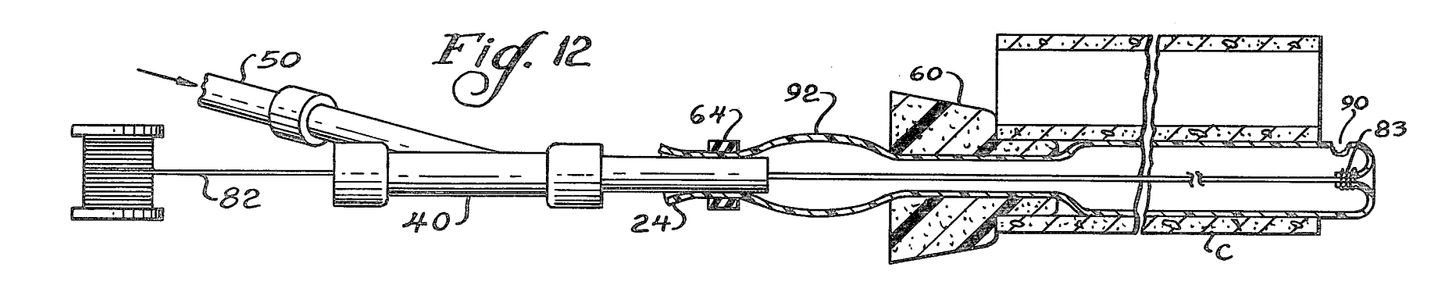
FIG. 12 is a view generally similar to FIG. 11 but shows the adapter pulled out of the near or entering end of the conduit and the tubing extended outwardly of both ends of the conduit.
Figure 13:
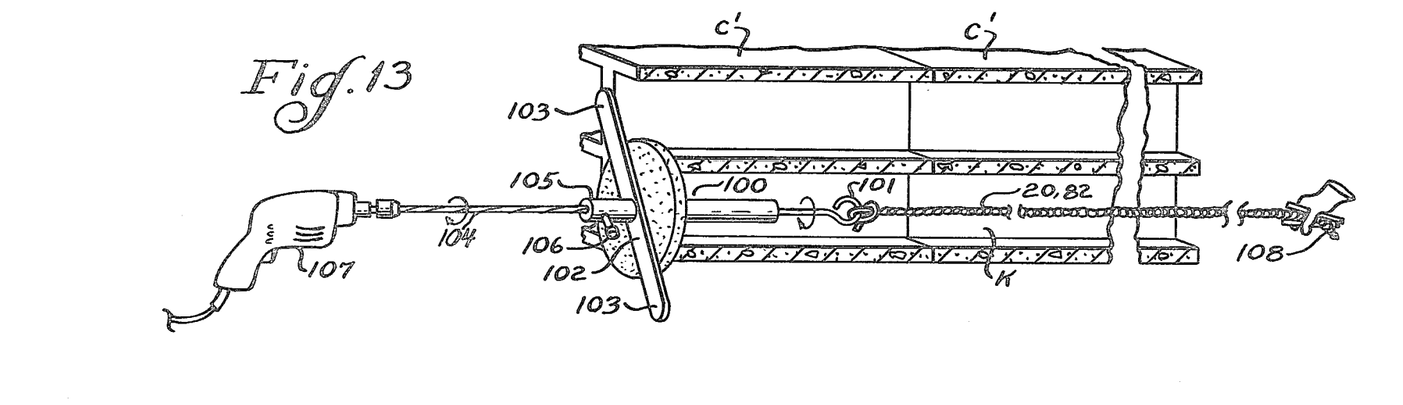
FIG. 13 is a view generally similar to FIG. 12; the adapter having been dissassembled from the tubing and the twister attached to the tubing and pull cord, the tubing being shown tightly twisted about the pull line into a tow line of higher tensile strength than either the tubing or its pull line Referring now more particularly to said several view.

Referring now to FIGS. 10-13 a second embodiment of the invention is illustrated wherein the pull line 82 and tubing is utilized in a way to make a relatively strong tow line. Thus FIG. 10 illustrates the severing of the tubing end 83 from the tubing supply outside the adapter 40 when the tubing is blown halfway through the conduit and tying a cord 82 thereto as in the first described embodiment. FIG. 11 shows the severed 83 of the tubing with the lead end of the cord 82 blown through the far end of the conduit. In this embodiment it is important that the tubing be severed far enough that several feet of tubing are blown through the far end of the conduit so as to permit the tubing to be punctured as at 90 in FIG. 12 and the tied ends 93 of the tubing and cord pulled therethrough. Desireably, the pulling of said tied end 83 through hole 90 should be continued until 20 to 30 feet of the inside tubing 29 and cord 82 have been drawn therethrough into the far manhole M'' (FIG. 1). Thereafter the adapter 40 should be withdrawn from the near end NC of the conduit, a portion 92 of the tubing being withdrawn, in the process, from the plug 60 to provide portion 92 which may be conveniently grasped while removing the lock-ring 64 to complete the separation of the adapter after severing the cord 82 from its supply on winch 84. Thereafter plug 60 can be removed from the conduit K and slid off the tubing and cord. Next, the cord and severed tubing at the near end of the conduit are passed through the twister plug 100 which is then forced into said conduit near end NC. Next, the severed tubing and cord assembly is passed through the eye 101 of the twister 102 and tied thereto as by two half hitches. Thereafter the arms 103 of the twister 102 are allowed to engage the exposed side of the twister plug 100 and the surrounding conduit end wall or edges. Flex shaft 104 may then by keyed to the stem of eye 101 through the outer end of the twister sleeve portion 105 and the housing of flex shaft 104 fixed to said sleeve 105 by latching thumb screw 106. Drill motor 107 then is attached to flex shaft 104. While a man at the far end of the conduit run utilizes gripper 108 to apply tension to the cord 82, the drill motor 107 may be energized to twist the tubing tightly about the cord which is then tied off at both ends to provide a tow line to tensile strength greater than that of the cord and the tubing.

From the aforesaid description of preferred embodiment of the invention both apparatus and method, it will now be appreciated that all the recited objects, features and advantages of the invention has been demonstrated as obtainable in a highly practical and efficient economical manner.

Having described the invention I claim.

1. A method of rodding open-ended conduit to facilitate passing of line through the conduit, said method
   utilizing tubing of air-tight, imperforate thin-walled plastic film which is non-elastic but sufficiently flexible that the tubing conforms to a shape against which it engages and may be supplied flat and wound in roll form;
   the tubing having a circumference no less than that of the conduit interior wall;
   and the steps of the method comprising
   drawing an end portion of the flat tubing off a supplied roll thereof, collapsing said tubing end portion through the bore of a closure member for the conduit which includes a tapered annular plug of resilient material having an entrant end sized to be snugly received within the near end of the conduit,
   then everting said tubing end portion fed through the closure member bore to form an annular pocket forwardly of the closure member which communicates with the bore of the closure member;
   inserting the closure member with its annular plug into the near end of the conduit to close said conduit near end and immovably fix said end portion of the tubing in said near end of the conduit; and
   blowing air through the bore of the closure member about the collapsed tubing to develope a pressure within the everted tubing end portion sufficient to displace the pocket portion to the far end of the conduit while pulling more tubing into the conduit through the bore of the closure member from the roll supply;
   the everted portion of the tubing between its fixed end and the displacing pocket increasing lengthwise in the direction of the far end of the conduit and opening up under the force of the air being blown into the pocket so as to engage and be conformed to the interior wall of the conduit and any impediments such as water or soil present in the conduit,
   said impediments and interior wall of the conduit affording shape and backup support to the flexible tubing as it opens in response to developing pressure in the tubing such that the tubing does not burst under the pressure developed in the tubing and forms a continuous air-tight liner extending lengthwise of the conduit to which a line may be attached for drawing through the conduit.

2. A method of rodding open-ended conduit to facilitate the passing of line through the conduit from one end to its other end comprising the steps of
   (a) locating an everted end portion of a length of thin highly flexible tubing within the rear end of the conduit with its inside out;
   (b) the length of the tubing having a circumference no less than that of the interior wall of the conduit;
   (d) shaping a portion of the tubing inwardly of its fixed everted end portion into an annular pocket about the tubing therebetween and its fixed end portion with the remainder of the tubing protruding back out through its said everted end portion and the conduit near end;
   (e) blowing air into said pocket so as to advance the tubing inwardly thereof toward the far end of the conduit;
   (f) the surrounding wall of the conduit giving yielding support and strength to the tubing against bursting as the tubing is advanced through the conduit;
   (g) halting the advance of the tubing part way through the conduit;
   (h) attaching a line to a portion of the tubing outwardly of the near end of the conduit; and
   (i) thereafter advancing the line-attached-portion to the tubing through the conduit to the far end of the conduit to draw the line through the conduit.

3. A method according to claim 2 wherein the tubing, after its line-attached-portion is advanced through the far end of the conduit, is twisted tightly about the line to form a tow lie of increased resistance to tension.

4. A method according to claim 2 wherein the tubing when advanced halfway through the conduit is severed from the length of tubing outside the near end, the line attached to said severed end, and the tubing thereafter advanced to deliver the attached line through the far end of the conduit.

5. A method according to claim 2 wherein the tubing is advanced through the far end of the conduit and the line is attached to the tubing portion advanced through said far end of the conduit.

6. A method according to claim 5 wherein the tubing is twisted before it is utilized to pull the line back through the conduit to the near end thereof.

7. A method according to claim 5 wherein as the tubing is pulled back through the conduit to draw the attached line through the near end of the conduit, air is blown into the tubing pocket to prevent collapse of the tubing.

8. A method of rodding conduit to facilitate the passing of utilities line or cable therethrough comprising the steps of inserting an everted end portion of a length of thin flexible tubing into the near end of the conduit.
   fixing said everted end portion of the tubing within the near end of the conduit and so to provide an annular pocket therebetween and the tubing which protrudes from said near conduit end;
   blowing air into said pocket to advance the pocket and thereby the tubing toward the far end of the conduit, halting advance of the tubing when the pocket is halfway through the conduit, severing the protruding portion of the tubing from the remainder of the tubing;

attaching a cord to the severed end of the protruding tubing portion, then resuming advance of the tubing until the severed end portion thereof with the cord attached is blown through the far end of the conduit.

and tightly twisting the tubing about the cord to provide a sturdy pull rope to which the utilities line or cable may be attached and drawn through the conduit by pulling on the cord and the tubing twisted thereabout.

9. A method according to claim 8 wherein the tubing has a circumference in section no less than that of the interior of the conduit such that the tubing is conformed by the air blown into said advancing pocket against the inner wall surface of the conduit which gives yielding support and strength to the tubing about obstructions as it is advanced through the conduit.

10. A method of rodding circuit to facilitate the passing of line or cable therethrough comprising the steps of everting the end portion of a length of thin-walled flexible non-elastic tubing, inserting and fixing said everted end portion of the tubing into the near end of the conduit to provide an annular pocket disposed inwardly of said conduit end between said fixed end and the portion of the tubing which protrudes from said conduit end, blowing air into the annular pocket constituted between said fixed end portion and protruding portion of the tubing so as to apply pressure against and thereby to advance the protruding tubing out through the far end of the conduit;

then securing the line or cable to the portion of the tubing advanced through said far conduit end; and while blowing air into the conduit between said fixed end portion and protruding portion of the tubing from said one end;

drawing the protruding end portion of the tubing back out through its fixed everted end portion to draw the line or cable through the conduit and out said near end thereof.

11. A method according to claim 10 wherein the air pressure applied between the fixed everted end portion and protruding portion of the tubing is reduced to a pressure which is sufficient to prevent collapsing of the tubing but less than that required originally to advance the tubing through the conduit to its far end.

12. A method according to claim 10 wherein the tubing is no less in circumference than the interior circumference of the conduit such that the tubing is pressed in everted relation against the surrounding conduit which provides yielding support and strength thereto such that the tubing does not burst as it is advanced through the conduit.

13. Apparatus for rodding conduit to facilitate passing of utility line or cable therethrough comprising, in combination, a reel on which is wound a length of tubing of thin-walled non-elastic plastic film which is readily flexible so as to conform to a shape against which it is engaged when subjected to low pressure, said tubing having a circumference substantially no less than that of the interior of the conduit with which it is to be used, an adapter having an axial bore of a diameter less than that of the tubing, a tapered annular resilient plug which snugly seats on the adapter;

said resilient plug being adapted to fix an end portion of the tubing within the conduit end when said tubing end portion has been passed through the bore of the adapter and everted back on its self to form a pocket about the tubing within the conduit therebetween and the fixed everted end of the tubing an air blower which communicates with the central bore of the adapter to apply air pressure into the conduit against said pocket to advance the tubing off the reel and towards the far end of the conduit and conforms the everted end portion of the tubing to the interior wall of the conduit, and means for collapsing the tubing as it is pulled off the reel to a diameter sufficiently small that it will readily pass through the bore of the adapter as air is blown through said bore to advance the tubing pocket through the conduit.

14. Conduit rodding apparatus as claimed in claim 13 including means for rewinding the tubing on the reel after it has been advanced through the conduit back to the adapter-mounted conduit end, and means for reducing the air pressure applied to the tubing pocket as the tubing is rewound on the reel.

15. Conduit rodding apparatus as claimed in claim 13 including a winch having a cord wound thereon, the free end of the cord being adapted for attachment to the portion of the tubing protruding from the central bore of the adapter to pass therethrough into the conduit as the tubing is blown through the conduit.

16. Conduit rodding apparatus according to claim 13 having means for measuring the length of tubing advanced off the reel through the adapter and into the conduit toward the other end thereof.

17. Conduit rodding apparatus as claimed in claim 15 further including means for tightly twisting the tube about the cord when it has been advanced through the opposite end of the conduit.

18. Apparatus as claimed in claim 13 further including means for pulling the tubing back through the interior of the tubing to the nearest end of the conduit, and means for directing air into the interior of the tubing at a lower pressure which is sufficient to prevent collapsing of the tubing while avoiding rupture thereof.

* * * * *

UNITED STATES PATENT AND TRADEMARK OFFICE
CERTIFICATE OF CORRECTION

PATENT NO. : 4,202,531

DATED : May 13, 1980

INVENTOR(S) : James C. Hamrick

It is certified that error appears in the above-identified patent and that said Letters Patent are hereby corrected as shown below:

IN THE CLAIMS:

Claim 2, column 8, line 11    change "rear" to --near--

Claim 10, column 9, line 23    change "circuit" to --conduit--

Signed and Sealed this

Twenty-ninth Day of July 1980

[SEAL]

Attest:

SIDNEY A. DIAMOND

Attesting Officer      Commissioner of Patents and Trademark